US007993434B2

(12) United States Patent
Oscar

(10) Patent No.: US 7,993,434 B2
(45) Date of Patent: Aug. 9, 2011

(54) DISPOSABLE AIR FILTER ASSEMBLY

(76) Inventor: Moreno A. Oscar, Cdad De Buenos Aires (AR)

( * ) Notice: Subject to any disclaimer, the term of this patent is extended or adjusted under 35 U.S.C. 154(b) by 427 days.

(21) Appl. No.: 11/332,953

(22) Filed: Jan. 17, 2006

(65) Prior Publication Data

US 2006/0117726 A1 Jun. 8, 2006

Related U.S. Application Data

(63) Continuation-in-part of application No. 10/709,001, filed on Apr. 6, 2004, now abandoned.

(51) Int. Cl.
*B01D 46/00* (2006.01)
(52) U.S. Cl. ............ 95/273; 55/385.2; 55/495; 55/501; 55/DIG. 34; 55/DIG. 31
(58) Field of Classification Search .................. 55/385.2, 55/355, 502, 508, 490, 507, 511, 513, DIG. 31, 55/DIG. 35, 497, 521; 454/187
See application file for complete search history.

(56) References Cited

U.S. PATENT DOCUMENTS

| | | | | | |
|---|---|---|---|---|---|
| 2,002,936 | A | * | 5/1935 | Davies | 55/499 |
| 2,551,408 | A | * | 5/1951 | Amundson | 292/202 |
| 2,992,702 | A | * | 7/1961 | Reid | 55/513 |
| 3,831,765 | A | * | 8/1974 | Flynn et al. | 210/484 |
| 3,853,529 | A | * | 12/1974 | Boothe et al. | 55/499 |
| 4,088,463 | A | * | 5/1978 | Smith | 55/480 |
| 4,340,402 | A | * | 7/1982 | Catron | 55/487 |
| 4,518,402 | A | * | 5/1985 | Dargel | 96/17 |
| 4,713,099 | A | * | 12/1987 | Schroeder | 55/385.1 |
| 5,100,445 | A | * | 3/1992 | Johnson et al. | 55/413 |
| 5,100,455 | A | | 3/1992 | Pinckard et al. | |
| 5,334,347 | A | | 8/1994 | Hollander | |
| 5,458,772 | A | * | 10/1995 | Eskes et al. | 210/238 |
| 5,525,145 | A | * | 6/1996 | Hodge | 96/17 |
| 5,782,944 | A | * | 7/1998 | Justice | 55/495 |
| 5,817,168 | A | * | 10/1998 | Wheless | 96/222 |
| 5,817,276 | A | | 10/1998 | Fencl | |
| 5,866,076 | A | | 2/1999 | Fencl | |
| 6,074,450 | A | * | 6/2000 | Raber | 55/497 |
| 6,245,293 | B1 | | 6/2001 | Fencl | |
| 6,267,924 | B1 | | 7/2001 | Fencl | |

(Continued)

OTHER PUBLICATIONS

Franklin Machine Products, The Franklin Filet, www.thefranklinfilter.com.

*Primary Examiner* — Duane Smith
*Assistant Examiner* — Minh-Chau Pham
(74) *Attorney, Agent, or Firm* — Assouline & Berlowe, PA; Loren Donald Pearson

(57) ABSTRACT

A disposable air filter and grill assembly is disclosed which eliminates the undesirable need of cleaning conventional air filter grills. The assembly includes a frame which can be mounted within a grid of a drop ceiling or other opening loading to a space to be heated and/or cooled. The frame includes a plurality of clips to removably secure a disposable filter unit therein. The disposable filter unit includes an outer shell within which filter media is positioned. After the unit has been used a sufficiently long period of time and needs to changed, the clips can be disengaged, the disposable filter unit can be removed, and a new unit can be installed. Accordingly, as opposed to cleaning existing grills which often result in a less than properly maintained facility or an aesthetically undesirable facility, the apparatus disclosed herein provides an aesthetically pleasing, functional, and easily maintained system.

15 Claims, 5 Drawing Sheets

U.S. PATENT DOCUMENTS

| | | |
|---|---|---|
| 6,280,686 B1 | 8/2001 | Scheir et al. |
| 6,313,470 B1 | 11/2001 | Fencl |
| 6,358,139 B1 * | 3/2002 | Renz ............................ 454/187 |
| 6,372,186 B1 | 4/2002 | Fencl |
| 6,379,412 B1 * | 4/2002 | Porterfield ..................... 55/493 |
| 6,423,882 B1 | 7/2002 | Fencl |
| 6,500,267 B1 | 12/2002 | Fencl |
| 6,554,880 B1 * | 4/2003 | Northcutt ..................... 55/385.2 |
| 6,589,476 B1 | 7/2003 | Fencl |
| 6,627,000 B2 | 9/2003 | Scheir et al. |
| 6,641,648 B2 * | 11/2003 | Walker et al. .................. 96/134 |
| 6,719,820 B2 | 4/2004 | Wolf et al. |
| 6,723,150 B2 * | 4/2004 | Parker ............................. 55/521 |
| 6,793,715 B1 | 9/2004 | Sandberg |
| 6,797,028 B2 * | 9/2004 | Duffy ........................... 55/385.2 |
| 6,942,710 B2 * | 9/2005 | Milano ........................... 55/480 |
| 6,997,578 B2 | 2/2006 | Culbert |
| 7,037,354 B1 * | 5/2006 | Dimicelli ....................... 55/497 |
| 7,156,891 B2 * | 1/2007 | Winters et al. .................. 55/497 |
| 7,169,202 B2 * | 1/2007 | Kubokawa ..................... 55/495 |
| 7,537,632 B2 * | 5/2009 | Miller et al. .................... 55/501 |
| 7,575,617 B2 * | 8/2009 | Ferguson ....................... 55/480 |
| 7,674,307 B2 | 3/2010 | Solberg, Jr. et al. |
| 7,753,982 B2 | 7/2010 | Merritt |
| 7,806,948 B2 | 10/2010 | Brock et al. |
| 7,811,346 B1 | 10/2010 | Henson |
| 2004/0182055 A1 | 9/2004 | Wynn |
| 2005/0091951 A1 | 5/2005 | Moreno |
| 2005/0095979 A1 | 5/2005 | Moreno |
| 2006/0174596 A1 * | 8/2006 | Choi et al. ..................... 55/467 |
| 2007/0113527 A1 * | 5/2007 | Song et al. ..................... 55/471 |

* cited by examiner

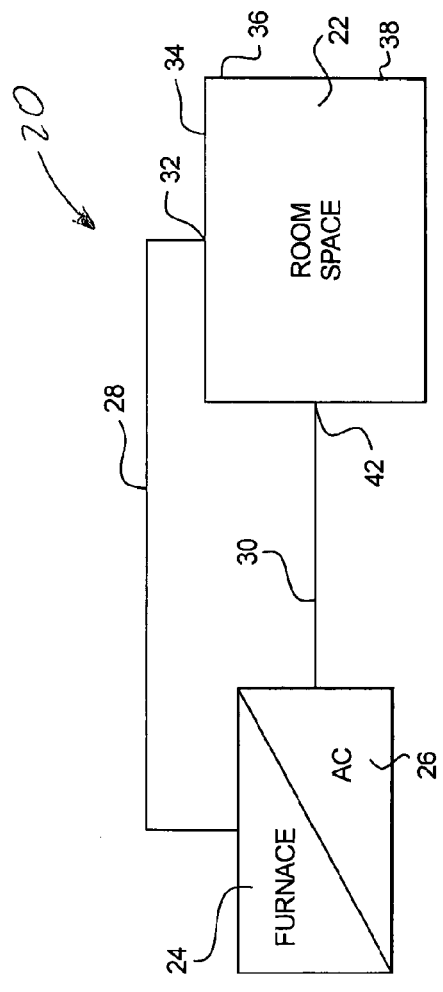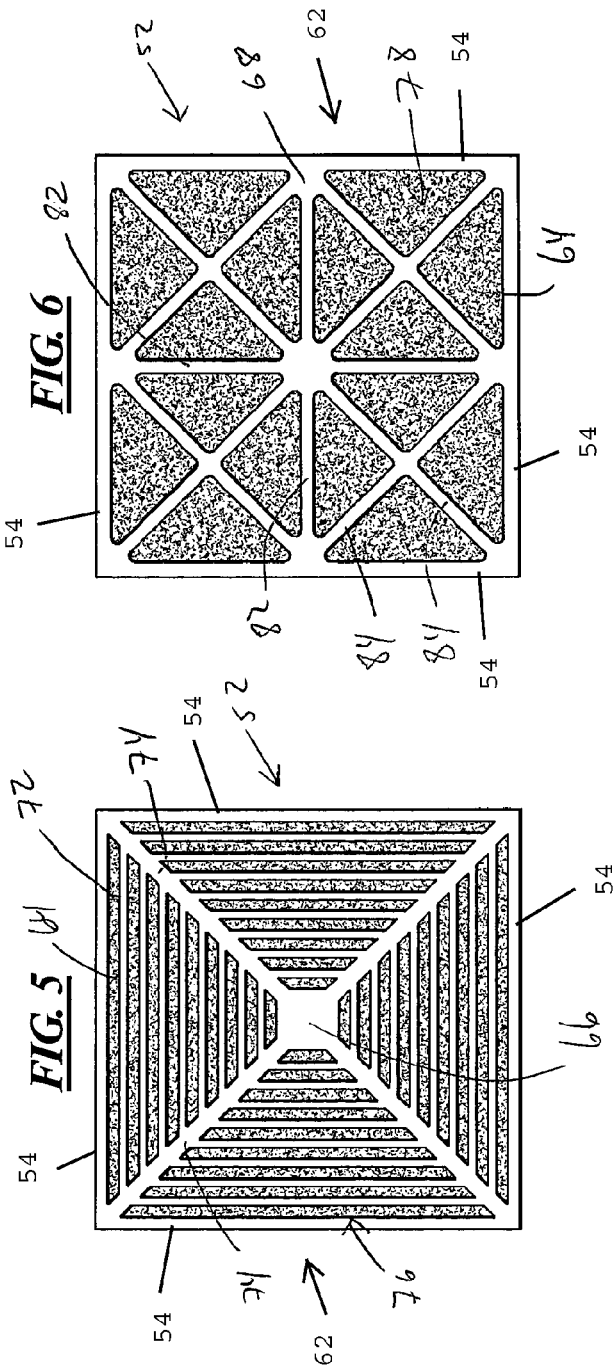

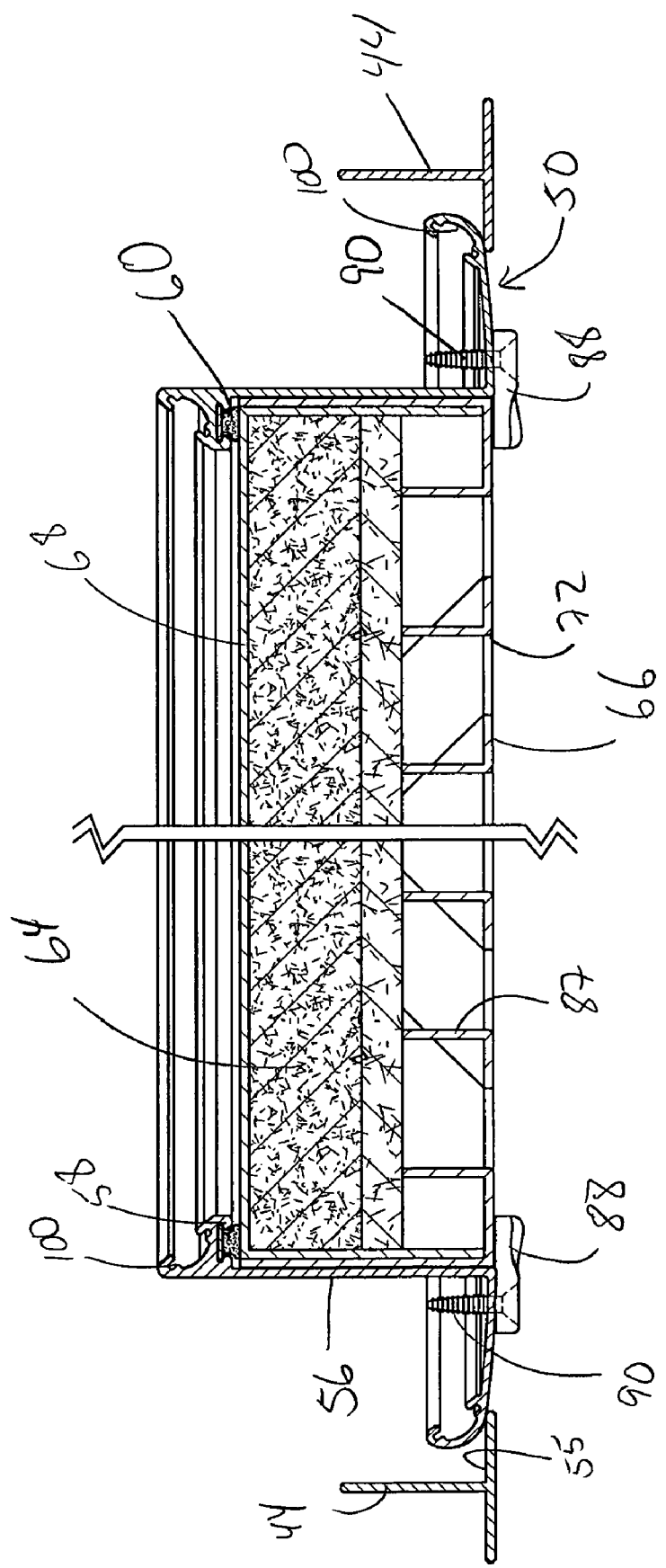

DISPOSABLE AIR FILTER ASSEMBLY

CROSS-REFERENCE TO RELATED APPLICATION

The present application is a continuation-in-part of U.S. patent application Ser. No. 10/709,001 filed on Apr. 6, 2004 now abandoned.

FIELD OF THE DISCLOSURE

The present disclosure generally relates to filters, and more particularly relates to air filters for heating, ventilation, and air conditioning systems.

BACKGROUND OF THE DISCLOSURE

In modern heating, ventilation, and air conditioning (HVAC) systems, air is forced through a furnace or air conditioner, directed by way of duct work to a space to be heated or cooled, and then re-circulated again by way of duct work back to the furnace or air conditioner. In some systems, it is common to provide an air filter at the return air inlet duct work from the space being heated or cooled. For example, if duct work is run through a ceiling, it is common to provide such a return in the ceiling to communicate the air from the space back to the furnace or air conditioner.

With conventional drop ceilings, acoustic tiles are held by way of a metallic grid positioned horizontally above the room, and the duct work is terminated within one of the square openings in the grid. A decorative protective grill is then typically mounted in the grid at that terminus and includes a plurality of horizontal louvers through which the air is communicated. A separate filter layer is then positioned behind the protective grill. The grill is typically manufactured from metal and periodically needs to be cleaned to remove grime, dust particles and the like. At the same time, the separate filter layer is typically discarded and replaced with a new filter.

Given such an arrangement with access to the grill area being awkward, such cleaning operations are typically either poorly performed or entirely disregarded. This not only can result in an unsightly appearance, but if the grill is provided within an environment wherein hygiene is of importance, such as a hospital or eating establishment, such grills can even be unhealthy.

Accordingly, a need exists for a disposable air filter and grill assembly which can be quickly replaced thereby eliminating the need for such cleaning and enhancing the hygienic features of the unit.

SUMMARY OF THE DISCLOSURE

In accordance with one aspect of the disclosure, an air filter assembly and grill is disclosed which comprises a frame and a disposable filter removably mounted in the frame. The frame includes a structure adapted to mount directly into a standard drop ceiling grid, while the disposable filter includes an outer shell within which is positioned filter media.

In accordance with another aspect of the disclosure, an air cleaning system is disclosed which comprises a source of forced air, duct work adapted to carry the forced air to a space and carry air back to the source of forced air, the duct work having at least one opening leading to the space, a frame mounted in the opening, and a disposable filter removably mounted in the frame, the disposable filter having an outer shell exposed to the space, the filter media being disposed within the outer shell.

In accordance with another aspect of the disclosure, a disposable grill and filter assembly adapted to be mounted within an opening provided in the ceiling or wall of a heating and ventilation system is disclosed which comprises a container having a front surface, a rear surface, four sidewalls, and filter media positioned within the container. The container is decorative and freely exposed to a room being heated and cooled by the system.

These and other aspects and features of the disclosure will become more readily apparent upon reading the following detailed description when taken in conjunction with the accompanying drawings.

BRIEF DESCRIPTION OF THE DRAWINGS

FIG. 1 is a schematic representation of an air cleaning system constructed in accordance with the teachings of the disclosure;

FIG. 4 is a cross-sectional view of the assembly of FIG. 1, taken along line IV-IV of FIG. 2;

FIG. 5 is a plan view of the front surface of the disposable filter of FIG. 1;

FIG. 6 is a plan view of the rear surface of the disposable filter of FIG. 1;

Figure 2:
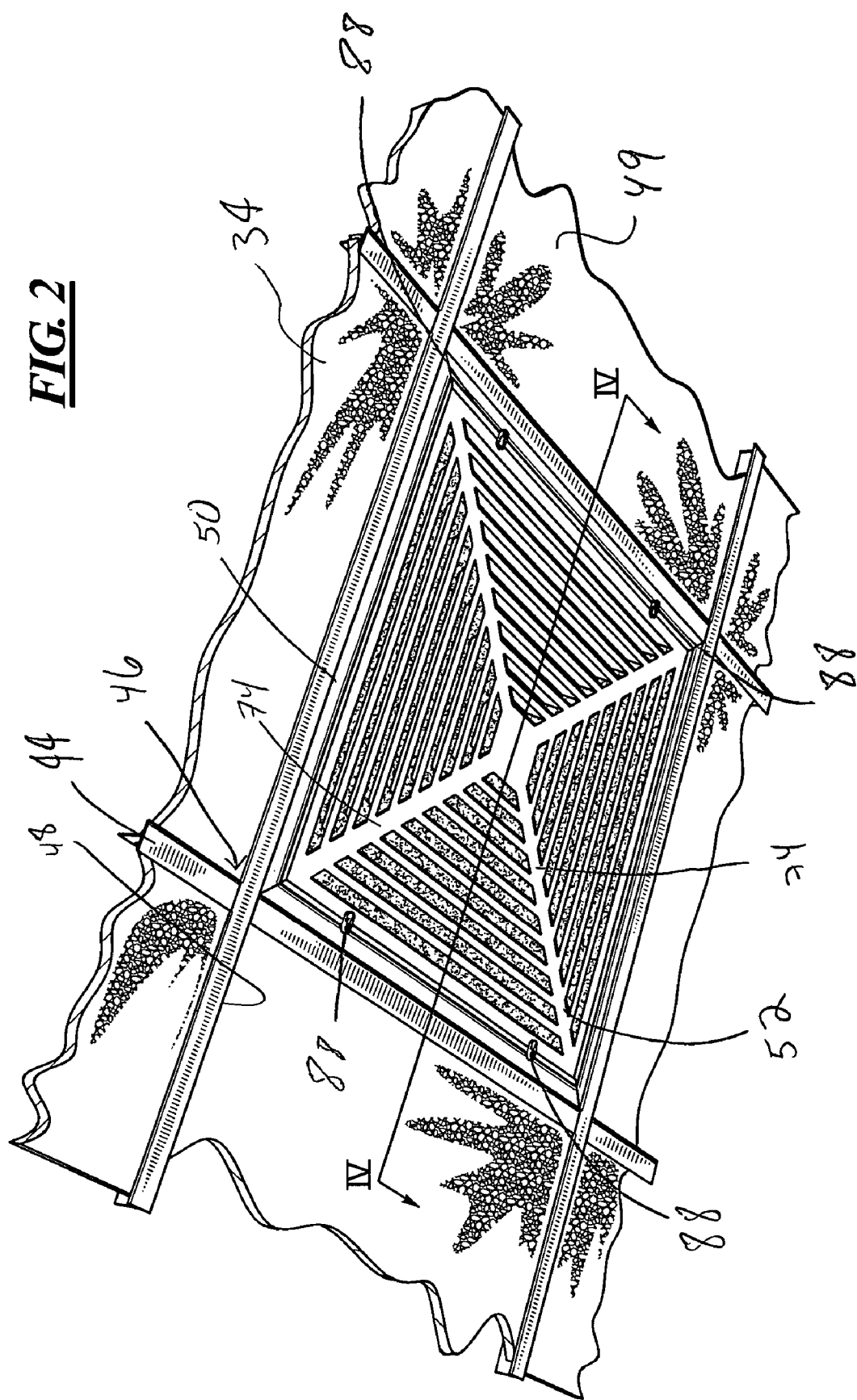
FIG. 2 is a perspective view of an air filter assembly constructed in accordance teachings of the disclosure and mounted within a ceiling.

While the present disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling with the spirit and scope of the disclosure as defined by the appended claims.

DETAILED DESCRIPTION OF THE DISCLOSURE

Referring now to the drawings, with specific reference to FIG. 1, an air cleaning system constructed in accordance with the teachings of the disclosure is shown and referred to by reference numeral 20. As shown therein, the system 20 provides apparatus by which a room or space 22 of a residence, commercial facility, hospital or any other enclosed space can be heated and/or cooled by way of either furnace 24 or air conditioner 26. Duct work 30 is provided to direct the treated air from the furnace and/or air conditioner 24, 26 to the space 22, with return duct work 28 being provided to communicate and recycle air from the space 22 back to the furnace 24 and/or the air conditioner 26. As shown, the duct work 28 terminates at an opening 32. The opening 32 can be provided as shown in a ceiling 34, however, the opening 32 could just as easily be provided within a wall 36 or floor 38 of the space as well. As will be described in more detail herein, within the opening 32 is provided an air filter assembly 40.

Referring now to FIG. 2, the air filter assembly 40 is shown in more detail mounted within the ceiling 34. More specifically, the ceiling 34 is shown to be of a drop or suspension type which includes a plurality of interlocked beams 44 forming a grid 46 comprised of a plurality of square openings 48. As will be readily understood by one of ordinary skill in the art, the beams 44 and grid 46 are suspended from the joists or rafters of the building within which the ceiling resides. Into each of the openings 48, an acoustic ceiling tile 49 can be placed, but in accordance with the present disclosure, the air filter assembly 40 can be secured.

Figure 3:
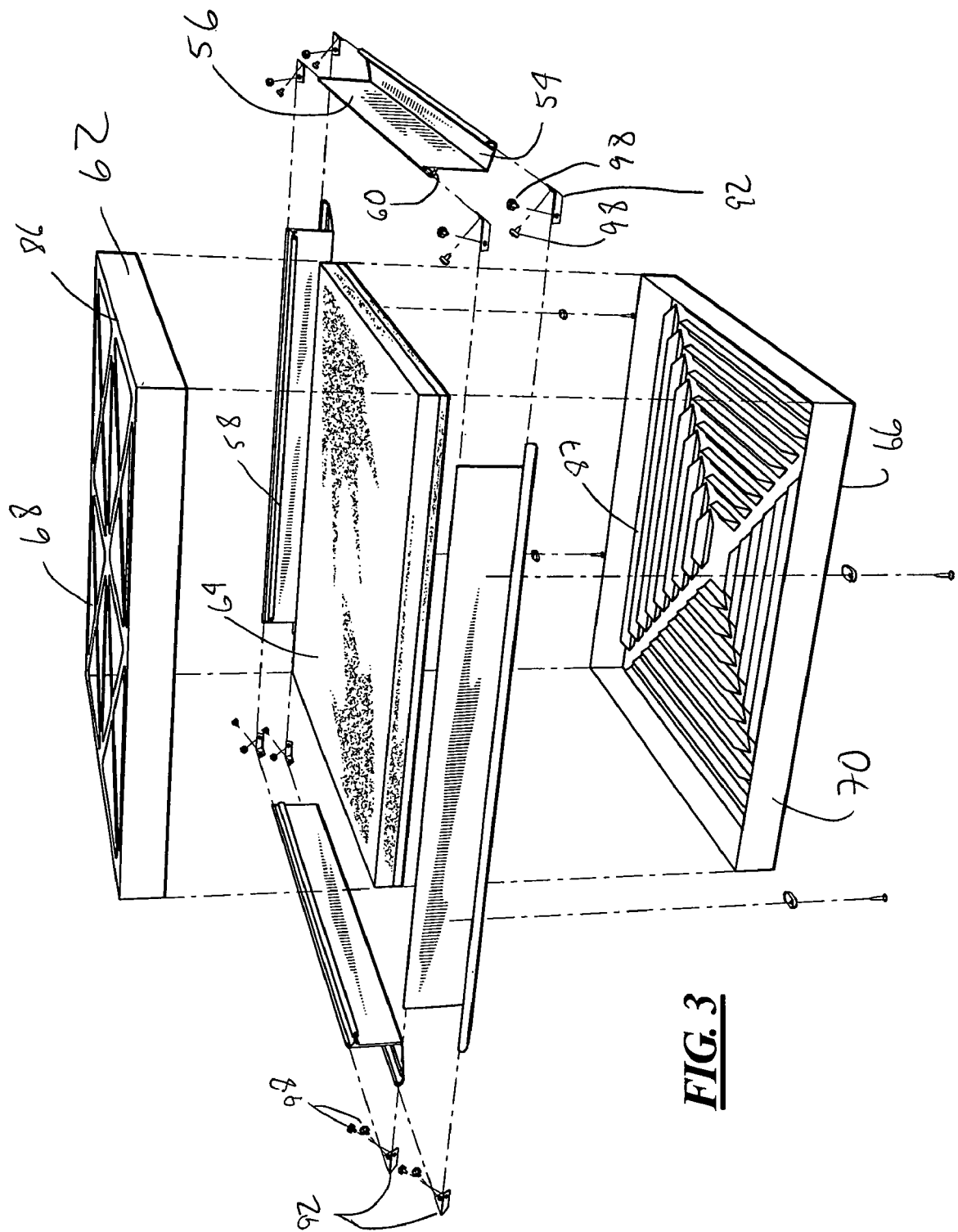
FIG. 3 is an exploded view of the air filter assembly of FIG. 1.

Referring now to FIGS. 2-4, the air filter assembly is shown to include a frame 50 as well as a disposable filter and grill assembly 52. The frame 50 can be manufactured from any number of different materials, but in the depicted embodiment is manufactured from a metal such as aluminum. The frame 50 forms a square complementary to the shape of one of the openings 32. In order to facilitate mounting of the frame 50 within the opening 32, an outer rim or ledge 54 is provided and dimensioned so as to not only fit within the opening 32 but also engage flanges 55 of adjacent beams 44. Accordingly, when the frame 50 is released, gravity holds the outer rim 54 against the flange 55 and thus within the opening 32. If desired, the frame 50 can be secured to the grid 46 by way of fasteners or the like.

Referring now to FIG. 4, the frame 50 is further shown to include not only the outer rim 54, but a partition 56 extending around the entire periphery of the frame 50, thus also forming a substantial square. As will be described in further detail herein, the partition 56 serves to center the disposable filter 52 within the frame 50.

Inwardly extending from the upwardly extending partition 56 is a lip 58. In the depicted embodiment, the lip 58 is perpendicular to the partition 56 and substantially parallel to the outer rim 54. As shown best in FIG. 4, it is the lip 58 against which the disposable 52 engages to ensure proper depth positioning of the filter 52 within the frame 50. Again, as will be described in further detail herein, the lip 58 also serves as a mounting surface for a gasket 60 between the frame 50 and the disposable filter 52. The gasket 60 can be manufactured from any number of different materials including elastomeric materials such as rubber, but in the depicted embodiment is manufactured from felt fabric adhered to the lip 58.

Referring now to FIGS. 4 and 5, the disposable filter and grill assembly 52 is shown in further detail. The disposable filter and grill assembly 52 can be manufactured from a number of different materials, but as it is designed to be disposable, i.e., discarded after use and replaced with a similar unit, it is manufactured from relatively inexpensive materials while at the same time providing both an aesthetically pleasing appearance and superior functionality in terms of filtering particulates from an air stream passing through the system 20. Accordingly, in the depicted embodiment, the disposable filter 52 includes an outer shell or grill 62 within which resides filter media 64. The outer shell 62 can be manufactured from any material including aluminum, plastic or cellulosic materials such as paperboard. Such materials are particularly effective for manufacturing and cost purposes, with aluminum having the added benefit of being inflammable. The filter media 64 in turn is manufactured from a foam material but any form of interwoven fiber or filter-type material would be effective as well.

The outer shell 62, as can be seen, forms a substantially rectilinear container having a front surface 66, a rear surface 68 and four sidewalls 70. The sidewalls 70 are each of an imperforate construction, but both the front surface 66 and rear surface 68 are in fact perforated to allow for air flow therethrough. More specifically, the front surface 66 includes a plurality of slots 72. In the depicted embodiment, the slots 72 are formed by first and second diagonal stripes 74 which dissect the front surface 66 into four triangular quadrants 76. Within each quadrant 76, an individual subset of slots 72 is provided. The slots 72 of each quadrant 76 are parallel as shown and of decreasing length as they move inwardly away from one of the sidewalls 70. In addition, the slots 72 of each adjacent quadrant 76 are substantially perpendicular to one another. In so doing, it can be seen that the outer shell 62 provides a decorative grill appearance to the room being heated and cooled.

The rear surface 68 is also provided with a plurality of openings but can be provided in any number of configurations. The configuration could be similar or identical to that of the front surface 66 or, as shown in FIG. 6, could be provided in the form of four square quadrants 78. More specifically, a horizontal and a vertical stripe 82 could be provided to dissect the rear surface 68 into the aforementioned square quadrant 78. Each square quadrant 78 could then be dissected by first and second diagonal stripes 84.

One of the reasons why the configuration of the openings of the rear surface 68 is not of as great importance as those provided on the front surface 66 is that the front surface 66 is fully exposed to the space 22 and thus to the occupants of the space 22. As one of the purposes of the system 20 is to provide an aesthetically pleasing system, it is believed that the configuration identified above and depicted in the figures not only provides functionality in terms of adequate air flow and filtering capability but also provides the filter and grill assembly 52 with an aesthetically pleasing appearance. Not only are the slots provided in an organized yet artistic fashion, but as conventional filter assemblies provide metallic grills with a plurality of parallel louvers, such an appearance is not a sufficiently drastic departure from readily accepted units so as to be an issue.

In terms of manufacturing, the outer rim 54 as indicated above, can effectively be manufactured from paperboard or aluminum and in fact can be manufactured from a single sheet of material stock which can then be stamped or die cut so as to not only form the slots 72 but also perforate the various fold lines 86 necessary to create the rectilinear container shape. If stamped, the paperboard 87 removed to form the slots 72 could remain attached and be folded in to snugly secure the filter media 64 in the outer shell 62 as shown in FIG. 4. Once those openings and fold lines are stamped, the sheet can be folded into the container configuration with the sidewalls 70 being secured by way of adhesives, staples, welds, or the like leaving one sidewall open for insertion of the filter media 64. In turn, filter media 64 can be dimensioned so as to slide within the container 62. Once positioned within the outer shell 62, the remaining sidewall 70 can be secured thus providing a complete disposable filter and grill assembly 52 ready for insertion into a frame 50. In alternative embodiments, the outer shell 62 can be a two or more piece assembly.

In order to insert the disposable filter 52 into the frame 50, clips 88 can be provided. It is to be understood that clips 88 are only one example of structure which can be used to hold the filter and grill assembly 52 in the frame 50. As shown in FIG. 3, clips 88 need to be swiveled, and or otherwise removed from the outer rim 54, to allow for insertion of the filter 52. The filter 52 is inserted until rear surface 68 engages the lip 58, or more particularly, the gasket 60 as shown in FIG. 4. Given the dimensions of both the filter 52 and the frame 50, once the rear surface 68 engages the lip 58, the clips 88 can be repositioned to secure the filter 52 within the frame 50. More specifically, in the depicted embodiment, the clips 88 are secured to the outer rim 54 by way of threaded fasteners 90 or the like, which are not tightened sufficiently so as to prevent rotation. Accordingly, the clips 88 can be swung or rotated about the fasteners 90 to allow for passage of the filter 52, and then rotated again to secure the filter 52 to the frame 50. Not only is such a structure effective, but the entire process of replacing the disposable filter 52 is greatly facilitated, reducing the process by a factor of many minutes if not hours. More specifically, as mentioned above, conventionally, only metallic grills are provided within the ceiling which periodically must be cleaned of the debris and particulates within the air stream. This is a very time consuming and undesirable task but by way of the pending disclosure, is simplified to a straight forward matter of rotating clips 88, removing the used filter and grill assembly 52, and inserting a new filter and grill assembly 52. The used filter and grill assembly 52 can then be thrown away and the process is complete.

Figure 8:
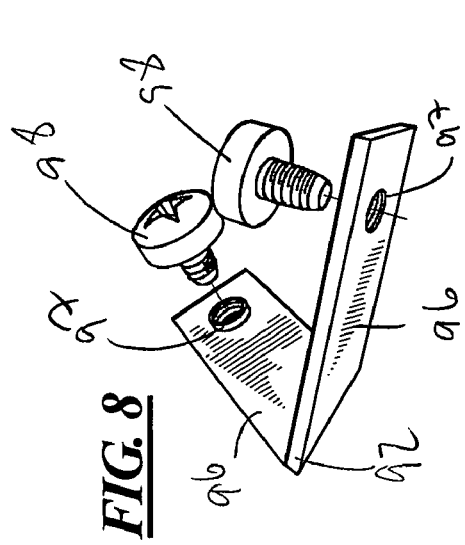
FIG. 8 is an exploded perspective view of a clip used to hold the frame together.
Figure 9:
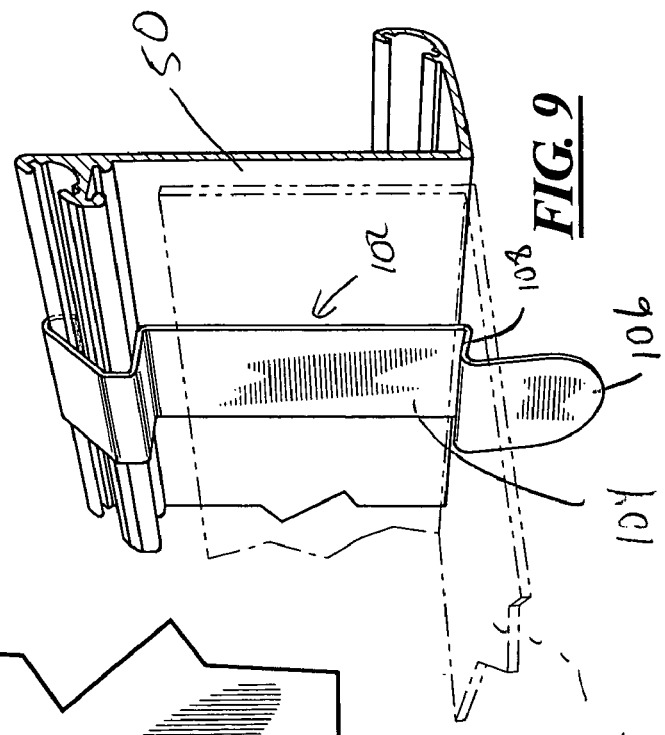
FIG. 9 is a partial cut-away view of an alternative clip used to hold a filter to the frame.
Figure 7:
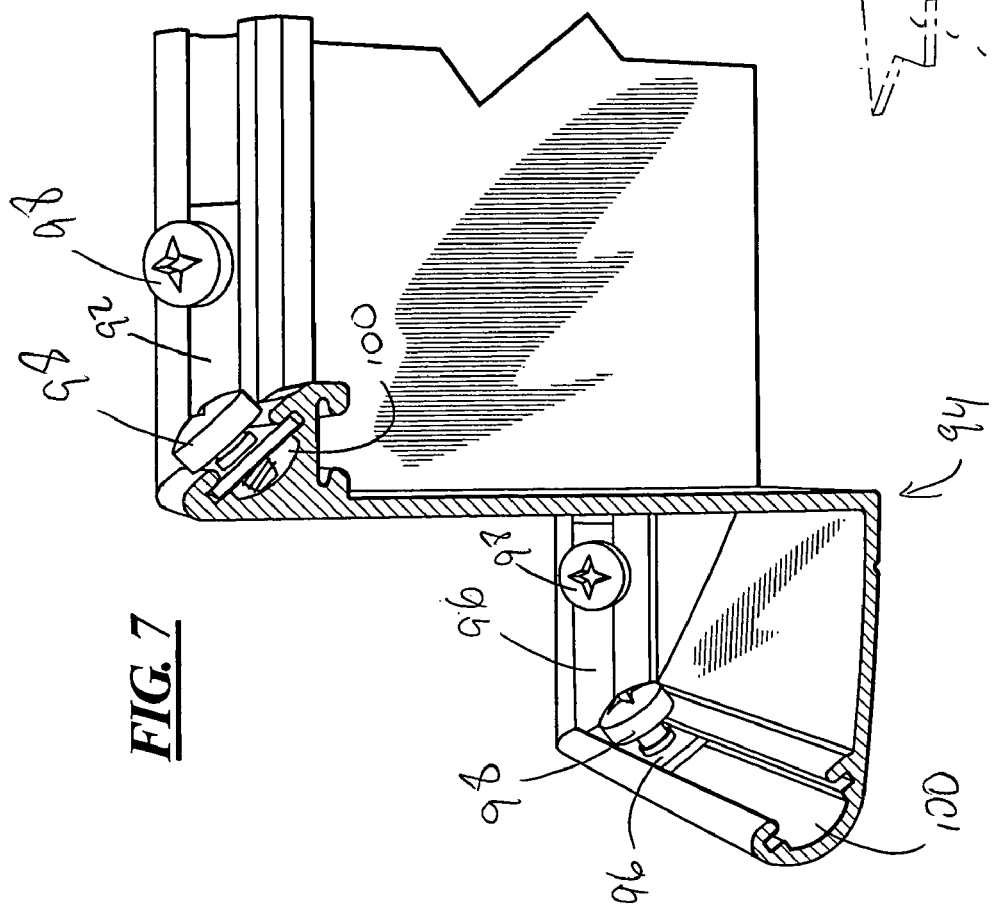
FIG. 7 is a partial cut-away view of a corner of the frame.

The design of the frame 50 facilitates construction as well. As opposed to corner welds, the frame 50 could employ brackets 92 at each corner 94 as shown in FIGS. 7 and 8. The brackets 92 could have first and second wings 96 through which set screws 98 extend by way of apertures 97. The corners 94 each include a track 100 within which the bracket 92 resides and against which the set screw 98 holds the bracket 92 when tightened.

In addition, as opposed to swivel brackets 88, the filter unit 52 would be held in the frame 50 by deformable tabs 102. The tabs could be made of resilient plastic or metal and be held to lip 58 with a downwardly depending leg 104 having a tongue 106. Outward depression of the tongue 106 would move ledge 108 out of contact with filter unit 52, thus allowing for removal or insertion of the filter unit 52. Deformable tabs 102 can also be used to retrofit existing conventional frames to accommodate the disposable filter and grill assembly 52, thus eliminating the need to clean conventional metal grills.

From the foregoing, it can be understood that the pending disclosure, teaches apparatus providing an air filter system for an enclosed space. The system greatly reduces the process of maintaining such filter units while doing so in an aesthetically pleasing and functional unit as well.

What is claimed is:

1. A method of filtering air in an air vent while decorating the air vent, which comprises:
   providing a combined disposable HVAC filter-and-frame assembly, said combined disposable HVAC filter-and-frame assembly including an outer shell and filter media, said outer shell having an outer face with slots formed therein, said outer shell appearing like an HVAC grill, and said filter media being integrally held within said outer shell;
   covering a HVAC conduit opening with said combined disposable HVAC filter-and-frame assembly with the outer face of the filter-and-frame assembly facing outward;
   maintaining visibility of said outer face during normal operation of a HVAC unit connected to the HVAC conduit;
   using said outer face of said combined disposable HVAC filter-and-frame assembly as an outermost grill over the HVAC conduit opening;
   removing the combined disposable HVAC filter-and-frame assembly after operating the HVAC unit; and
   replacing the combined disposable HVAC filter-and-frame assembly with a new combined disposable HVAC filter-and-frame assembly after removing the initial HVAC filter-and-frame assembly.

2. The method according to claim 1, which further comprises:
   inserting said combined disposable HVAC filter-and-frame assembly into an air-duct opening, said air duct opening defining an outer surface; and
   placing the outer surface of said combined disposable HVAC filter-and-frame assembly flush with the outer surface of the air-duct opening.

3. The method according to claim 1, which further comprises securing the combined disposable HVAC filter-and-frame assembly relative to the HVAC conduit during the operation of the HVAC unit by supporting the HVAC filter-and-frame assembly from outside the outer face.

4. The method according to claim 1, which further comprises moving air from a room through said combined disposable HVAC filter-and-frame assembly and into the air vent.

5. The method according to claim 4, which further comprises disposing of dirt visible in the room by removing said combined disposable HVAC filter-and-frame assembly from the air vent.

6. The method according to claim 5, wherein the dirt collected on said combined disposable HVAC filter is visible during operating of a HVAC unit.

7. The method according to claim 1, which further comprises forming a plurality of concentric non-overlapping rectangular slots in said outer face of said combined disposable HVAC filter-and-frame assembly.

8. The method according to claim 1, which further comprises disposing said combined disposable HVAC filter-and-frame assembly after removing said combined disposable HVAC filter-and-frame assembly.

9. The method according to claim 1, wherein the HVAC conduit opening is disposed on a ceiling.

10. The method according to claim 1, wherein said outer shell of said filter-and-frame assembly includes cellulosic material.

11. The method according to claim 1, wherein said filter media is fiberglass fibers.

12. The method according to claim 1, which further comprises replacing an outer grill with said combined disposable HVAC filter-and-frame assembly.

13. The method according to claim 1, which further placing said outer face of said combined disposable HVAC filter-and-frame assembly at an outermost location on the air vent.

14. The method according to claim 1, which further comprises obviating an additional outermost grill for decorating or supporting said combined disposable HVAC filter-and-frame assembly.

15. The method according to claim 1, which further comprises:
   seating said combined disposable HVAC filter-and-frame assembly in a frame with a clip; and
   maintaining unobstructed visibility of said outer face of said combined disposable HVAC filter-and-frame assembly except where said clip overlies said outer face during normal operation of the HVAC.

* * * * *